United States Patent [19]
Fulton

[11] Patent Number: 5,747,962
[45] Date of Patent: May 5, 1998

[54] METHOD AND APPARATUS FOR INCREASING THE STARTING TORQUE OF A TWO-PHASE SWITCHED RELUCTANCE MOTOR

[75] Inventor: Norman Neilson Fulton, Leeds, United Kingdom

[73] Assignee: Switched Reluctance Drives Limited, Harrogate, United Kingdom

[21] Appl. No.: 486,940

[22] Filed: Jun. 7, 1995

[30] Foreign Application Priority Data

Mar. 21, 1995 [GB] United Kingdom ............... 9505655

[51] Int. Cl.$^6$ ........................................ H02P 6/02
[52] U.S. Cl. ........................... 318/701; 318/254
[58] Field of Search .......................... 318/701, 254, 318/716–724

[56] References Cited

U.S. PATENT DOCUMENTS

| | | | |
|---|---|---|---|
| 3,679,954 | 7/1972 | Hedrick | 318/254 |
| 3,696,277 | 10/1972 | Liska et al. | 318/254 |
| 4,500,824 | 2/1985 | Miller | 318/701 |
| 4,507,591 | 3/1985 | Kelleher | 318/254 |
| 4,713,594 | 12/1987 | Bose et al. | 318/685 |
| 4,728,833 | 3/1988 | Shiraki et al. | 310/68 |
| 4,737,674 | 4/1988 | Miyao | 310/268 |
| 4,818,922 | 4/1989 | Sears et al. | 318/254 |
| 4,883,999 | 11/1989 | Hendershot | 310/254 |
| 5,111,095 | 5/1992 | Hendershot | 310/168 |
| 5,585,703 | 12/1996 | Acquaviva | 318/439 |
| 5,589,751 | 12/1996 | Lim | 318/701 |

OTHER PUBLICATIONS

Stephenson and Blake, *The Characteristics, Design and Applications of Switched Reluctance Motors and Drives*, (Jun. 1993, Nuremberg, Germany).

El-Khazendar & Stephensen, *Analysis and Optimization of the 2-phase Self-Starting Switched Reluctance Motor*, ICEM, Munchen, Sep. 1986.

*Primary Examiner*—David S. Martin
*Attorney, Agent, or Firm*—Arnold, White & Durkee

[57] ABSTRACT

A method and apparatus for increasing the starting torque of a two-phase switched reluctance motor is disclosed. The method involves the use of a specially constructed rotor position transducer with two sensing devices, each associated with one phase winding of the two-phase motor. The signals from the rotor position transducer are provided to a motor controller that energizes each winding whenever energization of the winding will produce torque in the desired direction.

31 Claims, 12 Drawing Sheets

METHOD AND APPARATUS FOR INCREASING THE STARTING TORQUE OF A TWO-PHASE SWITCHED RELUCTANCE MOTOR

FIELD OF THE INVENTION

This invention relates to reluctance machines and more particularly to switched reluctance motors. In particular, the present invention relates to a method and apparatus for increasing the starting and running torque of a two-phase switched reluctance motor.

BACKGROUND OF THE INVENTION

In general, a reluctance machine is an electric motor in which torque is produced by the tendency of its movable part to move into a position where the reluctance of a magnetic circuit is minimized, i.e. the inductance of the exciting winding is maximized.

In one type of reluctance motor the energization of the phase windings occurs at a controlled frequency. These motors are generally referred to as synchronous reluctance motors. In a second type of reluctance motor, circuitry is provided for detecting the angular position of the rotor and energizing the phase windings as a function of the rotor's position. This second type of reluctance motor is generally known as a switched reluctance motor. The present invention is applicable to switched reluctance motors.

FIG. 1 illustrates an exemplary switched reluctance motor having a stator 10 including six stator poles 11–16. Positioned within the bore formed by the stator and the inwardly pointing stator poles 11–16 is a rotor 18 which is mounted on bearings and is free to rotate. The rotor 18 has a number of outwardly extending projections 19 which form the rotor poles.

Associated with each stator pole is a wound coil of wire 17. In the illustrated motor, the six coils of opposing stator poles are coupled together to form three phases: Phase A (coils from poles 11 and 14); Phase B (coils from poles 12 and 15); and Phase C (coils from poles 13 and 16). In the example illustrated in FIG. 1, when Phase A is energized, electric current will flow through its coils such that stator pole 11 becomes, say, an inward-pointing electromagnet of positive polarity and stator pole 14 becomes an electromagnet of negative polarity. These electromagnets will produce a force of attraction between the energized stator poles and the rotor poles which will produce a torque.

By switching energization from one phase to another, the desired torque may be maintained regardless of the angular position of the rotor. By switching the energization of the phase windings to develop positive torque, the motor may be operated as a motor; by energizing the phase windings to develop a retarding torque the motor may be operated as a brake or generator.

FIG. 2 generally illustrates torque profiles for the three phases of the motor illustrated in FIG. 1 over three hundred and sixty degrees of rotor rotation. The torque profiles have been simplified for clarity of explanation. Torque profile 20 generally illustrates the torque profile of Phase A of the motor illustrated in FIG. 1 that would result if a constant current is passed through the winding coils positioned about stator poles 11 and 14 as a function of the rotor's angular position. As indicated in FIG. 2, there is an initial rotor position 21 when the rotor poles are completely unaligned with the stator poles 11 and 14. In this position, the energization of the phase winding for Phase A produces no torque. When the rotor is moved from this initial position, a positive torque is exerted on the rotor. As indicated by line 20 in FIG. 2, as the rotor's position nears the stator pole, the torque produced by the energized winding around the stator pole increases. The torque will continue to increase until just after the rotor and stator poles begin to overlap and will thereafter decrease. When the rotor and stator poles are completely aligned, for example at position 22, the torque will drop to zero. As the rotor's position continues to change with respect to the stator pole, negative torque will be produced until the rotor is again completely unaligned with the stator pole, for example at point 23, where the produced torque again becomes zero. As FIG. 2 indicates, the torque profile corresponding to the rotor's rotation from 180 to 360 degrees is identical to the 0–180 torque profile but offset 180 degrees.

Because the rotor and stator poles are regularly placed around the rotor and stator in the example of FIG. 1, the torque profiles for the other two phases are the same as that for Phase A, but are displaced by 60 degrees. In FIG. 2, the torque profile for Phase B is represented by line 24 and the torque profile for Phase C is illustrated by line 25. In general, for a reluctance machine with rotor and stator poles arranged in a symmetric fashion, the torque profiles of all phases will be the same but displaced $360/(N_r*p)$ where $N_r$ is the number of rotor poles and p is the number of phases.

In many motor applications it is desirable to be able to energize the motor such that it produces a relatively high torque. Such a desired constant torque is illustrated by the line $T_D$ in FIG. 2. Referring again to FIG. 2, it may be noted that, for any given rotor position there is always a phase that can be energized to give positive torque near the desired torque $T_D$. For example, if the rotor is at position 26, Phase A can be energized to provide a torque near the desired torque $T_D$. If the rotor is at position 27, Phase B can be energized to give a torque near $T_D$; and if the rotor is at position 28, Phase C can be energized to produce a torque close to the desired torque $T_D$.

In addition to having the capability of providing a relatively high torque $T_D$, regardless of rotor position, the reluctance motor of FIG. 1 is also capable of providing a relatively constant, continuous torque, by always energizing the winding that produces the torque most near the desired torque $T_D$. In general, for any reluctance motor having three or more phases, it is always possible to energize a winding and produce a torque at or near a desired constant torque $T_D$.

Typical two-phase reluctance motors, unlike the motor illustrated in FIG. 1, are not capable of producing a relatively high desired torque $T_D$ at all possible rotor positions. This is because, for two-phase motors, the regions of positive torque for the different phases do not significantly overlap. This is generally illustrated in FIGS. 3 and 4.

FIG. 3 generally illustrates a typical two-phase reluctance motor. The two-phase motor includes a stator 30 having four stator poles 31–34, around which coils 17 are placed. The coils are connected in pairs to form two-phase windings: Phase A, comprising the coil from poles 32 and 34, and Phase B comprising the coils around poles 31 and 33. The motor also includes a rotor 35 having two rotor poles. In the motor illustrated in FIG. 3, the rotor 35 is constructed such that a "stepped air-gap" 36 is provided at each rotor pole. As those skilled in the art will recognize, the introduction of the stepped air-gap 36 "stretches" the positive region of the torque profile for each phase of the motor. This renders the torque profile of each phase of the motor asymmetrical in that the region of positive torque extends over a larger angle than the region of negative torque. This asymmetrical torque profile provides a slight overlap between the positive torque regions of the two-phases and ensures that, for any rotor position, it is possible to generate positive torque. The use of stepped air-gaps allows for starting of a two-phase motor at any rotor position. The use of stepped-air gap rotors for two-phase reluctance motors is generally known in the art and is discussed, for example, in El-Khazendar & Stephenson, *Proceedings of the ICEM* Munich (1986).

FIG. 4 generally illustrates the torque profile for the two-phase motor of FIG. 3 over one hundred and eighty degrees of rotation when a relatively constant current flows through the motor windings. Line 41 generally illustrates the torque profile for Phase A and line 42 generally illustrates the torque profile for Phase B. As illustrated, the use of the stepped air-gap rotor stretches the torque profiles of the two-phases such that there are overlap regions, near points 43 and 43', where the produced torque from both phases is positive. Points 43 and 43' represent the points where the two torque profiles cross.

In known two-phase switched reluctance motors, a rotor position transducer (RPT) with a single position sensor, such as a Hall-effect device or an optical device, is used to control the energization of the windings. A single sensor device is used because the two-phase windings are each energized one-half of the electrical cycle. Thus, when the output of the single sensor is one level (e.g., a logic one) the first phase winding is energized. When the output of the single sensor changes to the opposite logic level (e.g., logic zero) the first phase winding is de-energized and the second phase winding is energized. Under this approach, the energization of the two-phase windings is mutually exclusive and the time duration of the single sensor's logic one is substantially equal to the time duration of the sensor's logic zero output. Typically, the points at which one phase winding is de-energized and the other energized is the point at which the torque profiles of the two-phases cross (i.e., points 43 and 43' in FIG. 4).

FIGS. 5 and 6 illustrate an RPT typical of the type used with known two-phase switched reluctance motors. In the typical configuration, a shaft 50 is coupled to the rotor 35 of a two-phase switched reluctance motor. Coupled to the shaft 50, so that it rotates with the shaft, is a vane 51 that has two different regions: mark regions 52 and space regions 53. A sensing element 54 is positioned at a location sufficiently near the shaft to sense whether it is near a mark or space region of the vane. In known two-phase switched reluctance motors, each mark and space region of the vane is substantially equal, with each being generally defined by an angular expanse of approximately $(180/N_r)$ degrees, where $N_r$ is the number of rotor poles.

In operation, the sensing element 54 produces a first signal of one logic value (e.g., a high voltage or logic "1") when a mark region of the vane is located near the sensing element 54 and produces a second signal of a different logic level (e.g., a low voltage or logic "0") when a space region of the vane is located near the sensor. As those skilled in the art will recognize, when a vane 51 having say, two equal mark/space regions is utilized, over each 180 degree rotation of the rotor the sensing device 54 will produce a logic "1" signal over half of the rotation and a logic "0" signal over the other half of the rotation. This is generally illustrated in FIG. 6A, where the output of the sensing device 54 is shown to be a logic "1" as the rotor rotates from the position defined as 0 degrees to the position defined as 90 degrees, and a logic "0" as the rotor rotates from the 90 degree position to the 180 degree position. Since the construction of the vane is symmetric, the signal repeats over the period of rotation from 180 degrees to 360 degrees.

In known two-phase switched reluctance motors, since each phase winding is energized mutually exclusive of the other, the output from the single sensing device 54 can be used to control the energization of the motor. For example, during the interval when the output of sensor 54 is logic "1", one phase winding, e.g., Phase A, is normally energized and Phase B de-energized. During the interval over which the output of sensing device 54 is logic "0" the other phase winding, Phase B in this example, is energized and Phase A is de-energized. This is generally illustrated in FIGS. 6B and 6C. As those skilled in the art will recognize, the electronics required to convert the output of sensing device 54 into a switching signal for the phase windings are straightforward and can be constructed at low cost.

There are a number of types of vanes 51 and sensing devices 54 that are used in switched reluctance motors. For example, vane 51 can comprise a disk with light transmissive and light blocking elements that define the mark and space regions, and sensing device 54 can comprise a sensor with a light source and a light detector where the mark regions of the vane 51 interrupt the light beam from the source to the detector. For the light transmissive/light blocking vanes it is sometimes desirable to slightly adjust the angular expanse of the mark regions to compensate for the finite width of the light beam so that sensor 54 produces logic high and logic low signals of equal duration. As another example, vane 51 can include mark regions of ferromagnetic material and sensing device 54 can comprise a Hall-effect device that produces a first logic signal when the sensor is in the presence of the ferromagnetic signal and a second logic signal otherwise. For the type of sensing device illustrated in FIG. 5, it is known to adjust the angular expanse of the mark region to compensate for the proximity effect of flux fringing in the air adjacent to the ferromagnetic vane. The adjustment is made so that the sensor 54 produces logic high and logic low signals of equal duration.

For typical two-phase motors, such as the motor of FIG. 3, there exists a rotor position, near points 43 and 43' in FIG. 4, where the torque that the motor is capable of producing is relatively low. In many two-phase motors, the torque at this low point can be 30% or less of the maximum torque that the motor can produce. This low torque point can cause problems in that it can be difficult to start the motor if the rotor comes to rest at a position near the positions represented by points 43 and 43'. Additionally, when the motor is running, the low torque point results in significant variations in the torque output of the motor. These variations in torque output, referred to as torque ripples, are generally undesirable.

One known method of increasing the starting torque of the motor and decreasing the amount of torque ripple, is to profile the magnitude of the current applied to the phase windings such that the current flowing through the phase winding (and therefore the produced torque) is greater at points 43 and 43' than it would otherwise be. This approach is undesirable because it not only requires relatively complex control circuitry that offsets the low-cost, simple design advantages that make two-phase reluctance motors desirable, but also requires a considerable up-rating of the power converter to handle the increased current.

The present invention provides a method and apparatus for increasing the starting torque of two-phase reluctance motors and for decreasing the torque ripple in two-phase machines without profiling the current in the phase windings and without increasing the current rating of the switches in the power converter.

SUMMARY OF THE INVENTION

The present invention is generally directed to a method of operating a two-phase switched reluctance motor to produce increased and smoother torque, where the motor includes a rotor, a first phase winding and a second phase winding, by energizing both phase windings simultaneously during part of each rotational period of the rotor.

In one embodiment of the present invention, a control system for controlling two-phase switched reluctance motors is provided to produce torque in a desired direction. The control system includes a first rotor position transducer that produces a signal of a first level whenever energization of the first phase winding will produce torque in the desired direction, a second rotor position transducer that produces a signal of the first level whenever energization of the second phase winding will produce torque in the desired direction. The control system also includes a first switching device electrically coupled to the first rotor position transducer for energizing the first phase winding whenever the signal produced by the first rotor position transducer is of the first level and a second switching device electrically coupled to the second rotor position transducer for energizing the second phase winding whenever the signal produced by the second rotor position transducer is of the first level.

A still further embodiment of the present invention includes a switched reluctance motor system comprising a two-phase switched reluctance motor including a stator, a first phase winding, a second phase winding and a rotor. Associated with the motor are first and second rotor position transducer sensors for producing signals that respectively control the energization of the first and second phase windings.

Yet another embodiment of the present invention provides a rotor position transducer assembly for a two-phase switched reluctance motor including a rotor, a shaft coupled to the rotor, a first phase winding and a second phase winding wherein the rotor and the phase windings are arranged to produce torque in a desired direction. The rotor position transducer assembly of this embodiment includes a first sensing device for producing signals to control the energization of the first phase winding; a second sensing device for producing signals to control the energization of the second phase winding; and a vane coupled to the shaft where the vane includes mark regions and space regions.

BRIEF DESCRIPTION OF THE DRAWINGS

Other aspects and advantages of the present invention will become apparent upon reading the following detailed description and upon reference to the drawings in which.

Similar reference characters indicate similar parts throughout the several views of the drawings.

DETAILED DESCRIPTION OF THE INVENTION

In the present invention, a novel switching arrangement is provided for energizing the phase windings of a two-phase switched reluctance motor such that the starting torque of the motor is increased and the torque ripple decreased. In the present invention, two RPTs are used to control the energization of the phase windings where each RPT independently controls the energization and de-energization of one of the phase windings. Moreover, in the present invention, each of the two RPTs is configured such that the phase winding corresponding to the RPT switches ON near the point that its energization will produce positive torque and switches OFF when its torque drops near zero. In this switching scheme, there are periods during each complete rotation of the rotor in which both phase windings are energized at the same time. During these periods the torque produced by the energization of the two windings is additive, resulting in a greater torque production than would be available if only a single phase winding was energized.

Figure 7:
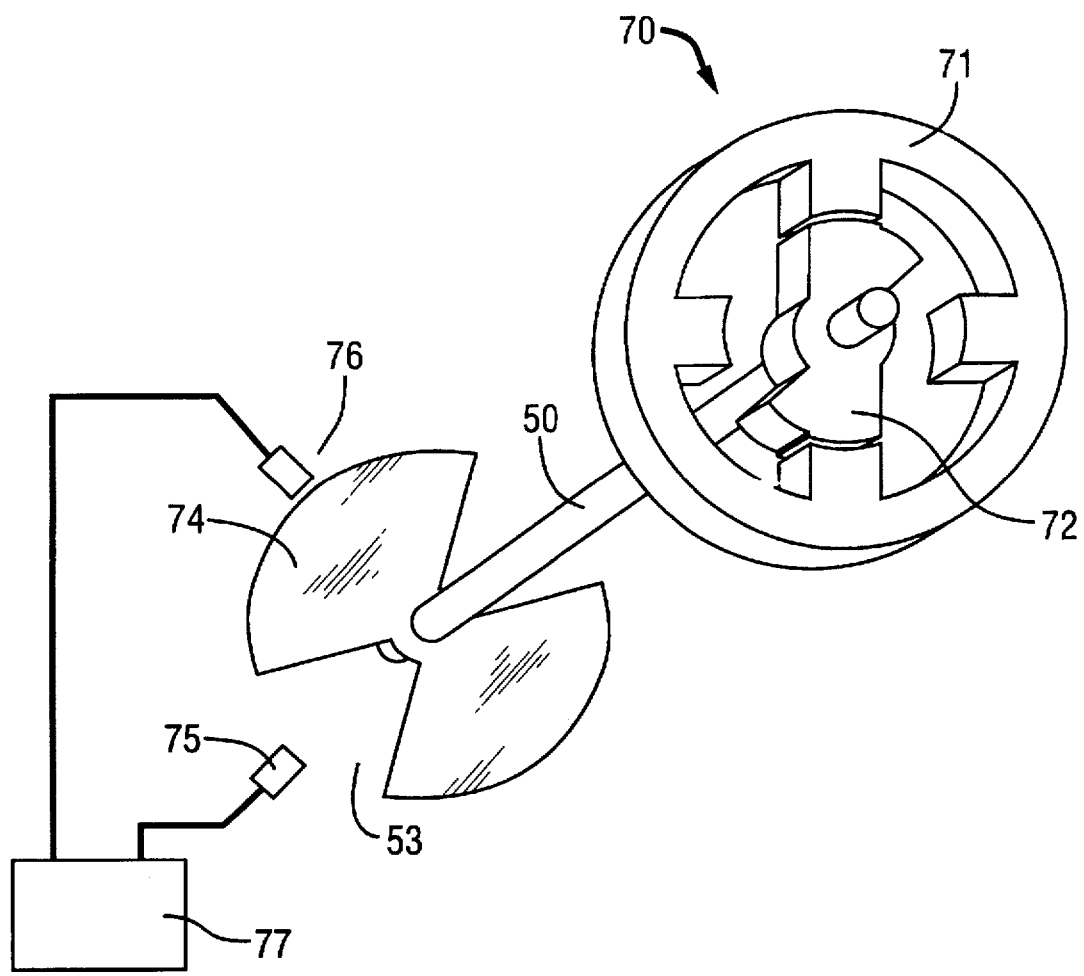
FIG. 7 generally illustrates a two-phase switched reluctance system constructed in accordance with the present invention.

FIG. 7 generally illustrates a two-phase switched reluctance motor system constructed in accordance with the present invention. The system generally includes a switched reluctance motor 70, including stator 71 and rotor 72 and two RPTs comprising a specially configured vane 74 coupled to the motor shaft and two sensing devices 75 and 76. The outputs of the sensing devices 75 and 76 are provided to an electronic controller 77 that controls the energization of the phase windings of motor 70.

Figure 1:
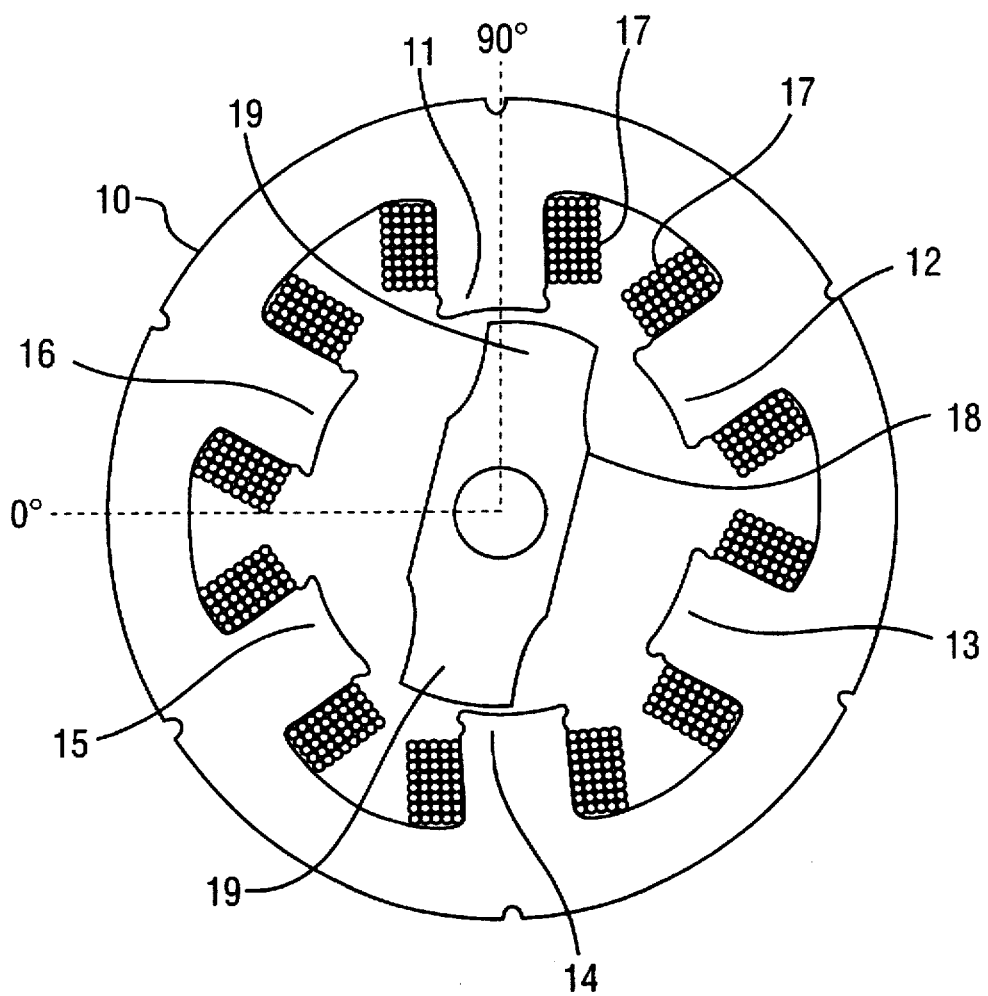
FIG. 1 illustrates a typical three-phase reluctance motor having six stator poles and two rotor poles.
Figure 2:
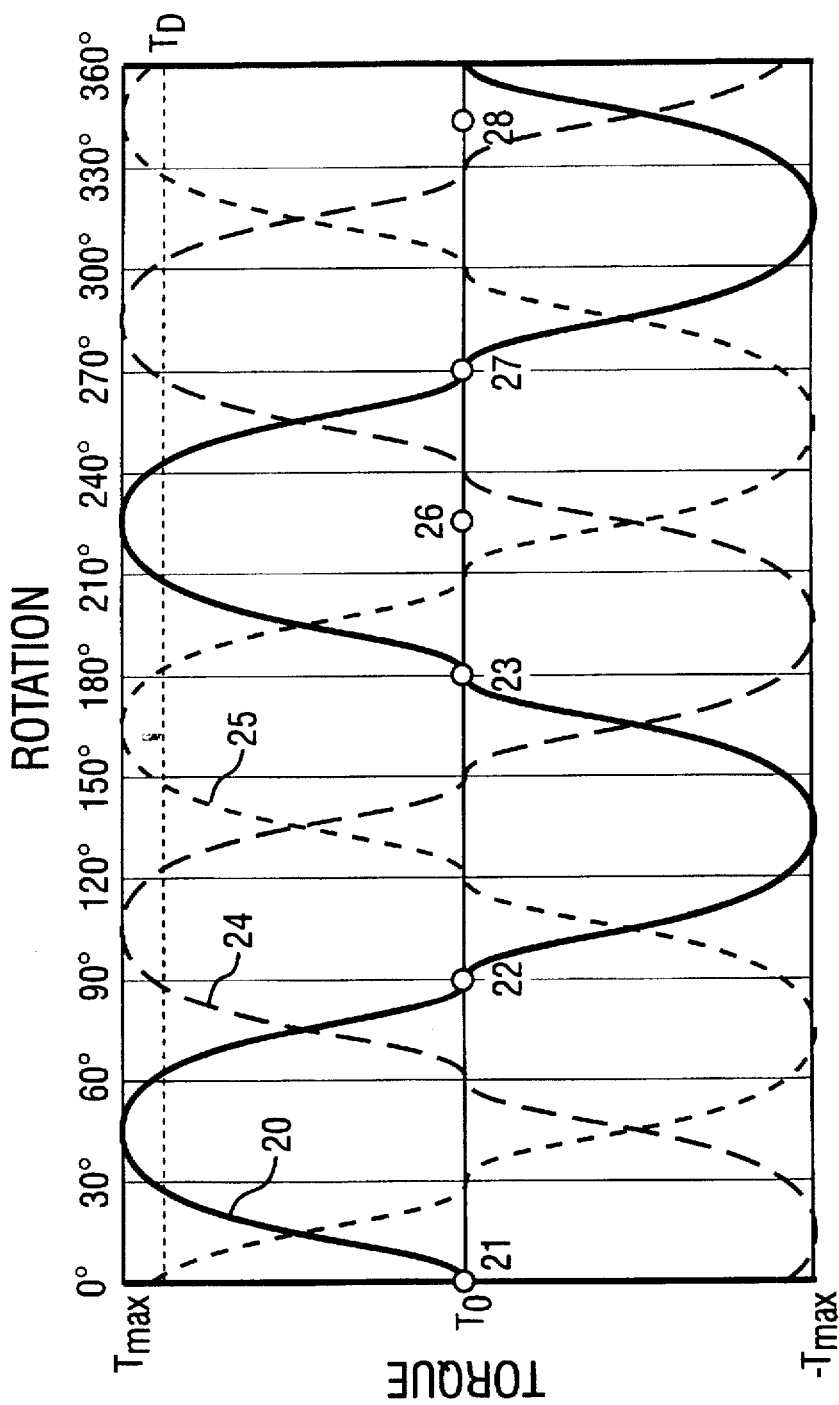
FIG. 2 generally illustrates the torque profile for the three-phase reluctance motor of FIG. 1.
Figure 3:
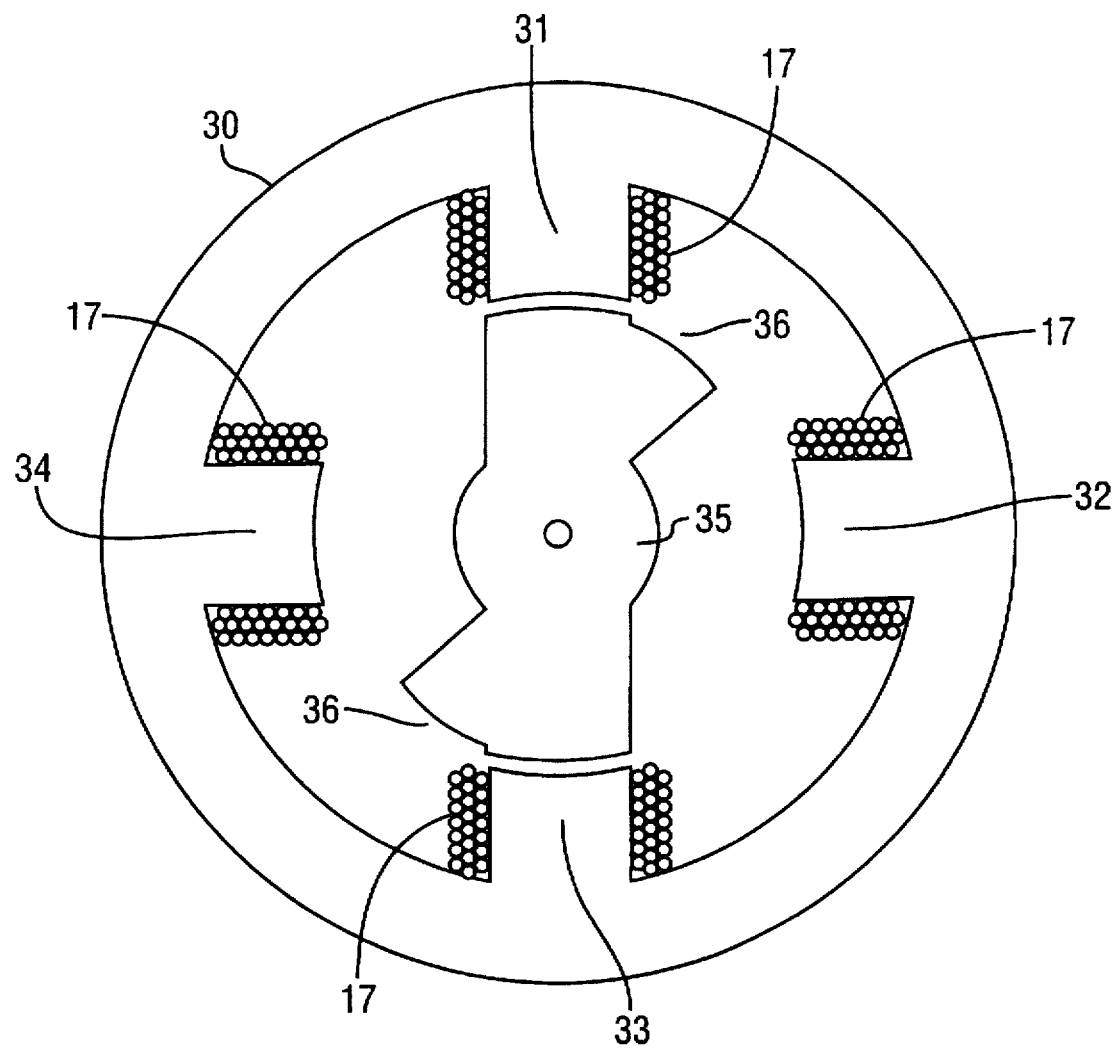
FIG. 3 illustrates a two-phase switched reluctance motor having four stator poles and a two pole, stepped-air gap rotor.
Figure 4:
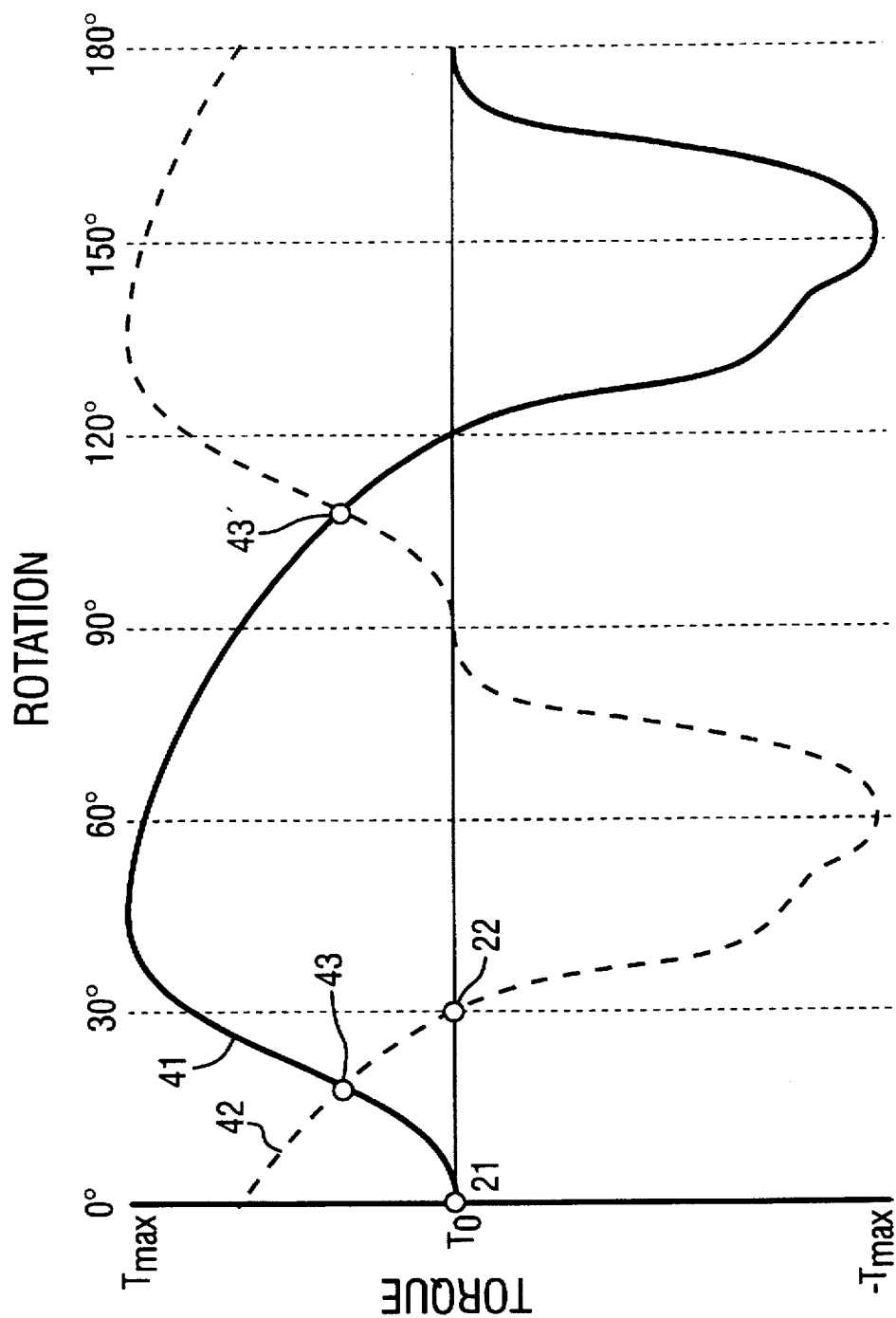
FIG. 4 generally illustrates the torque profile for the two-phase reluctance motor of FIG. 3.

The rotor 72 of the motor 70 in FIG. 7 is a two-pole stepped air-gap rotor similar to that illustrated in FIG. 3. The present invention is not limited to the use of stepped air-gap rotors, but applies to all two-phase reluctance motors in which each phase can produce positive torque for more than one-half of the rotor's angular rotation. Embodiments are envisioned where stepped, graded or other forms of rotors are used.

The construction of the motor for use in the present invention may, except for the number and placement of the RPT, follow conventional switched reluctance motor construction methods. For example, the stator may be constructed of a number of stacked stator laminations having stator poles around which are wound the motor windings. The rotor may be constructed of number of stacked rotor laminations affixed to a shaft. The construction of two-phase switched reluctance motors is generally understood and is not set forth in detail herein.

Figure 5:
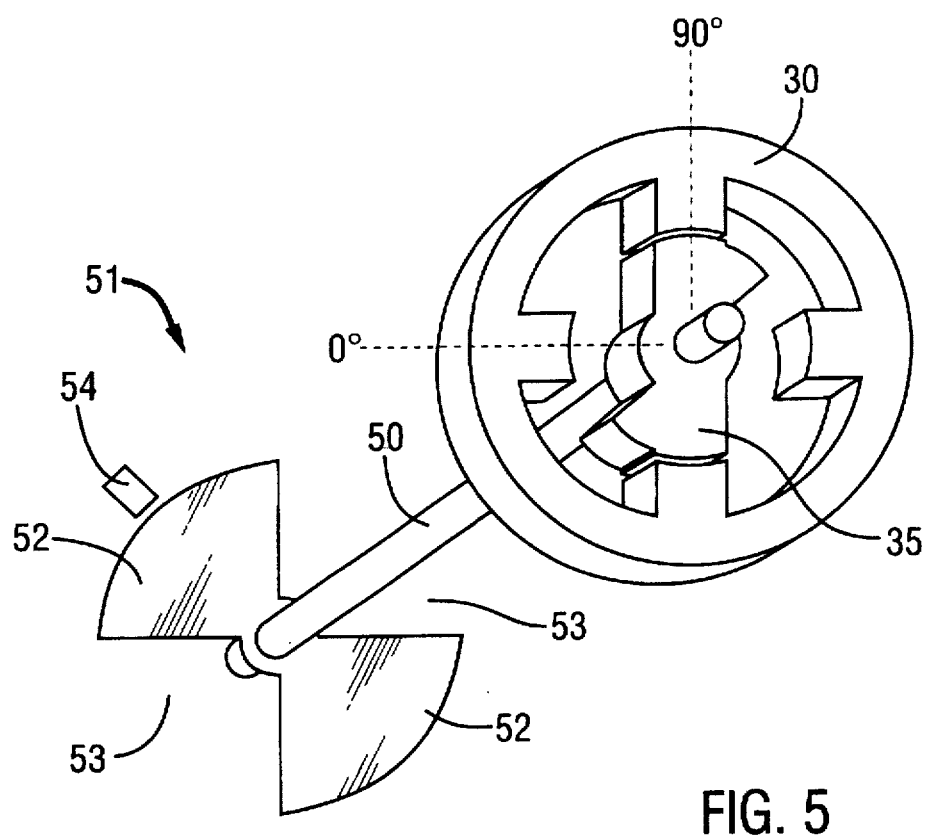
FIG. 5 generally illustrates an RPT of the type used in known switched reluctance motors.
Figure 6A:
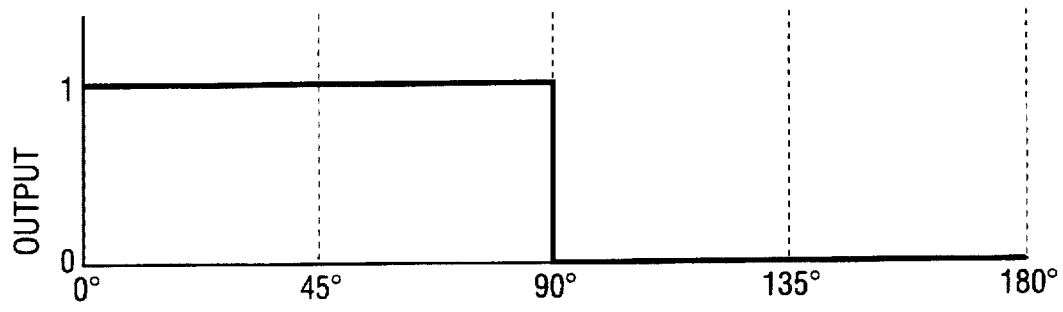
FIGS. 6A–6C generally illustrate the output of the sensing device of the RPT of FIG. 5 and the switching signals for the phase windings of the two-phase reluctance motor of FIG. 3.
Figure 6B:
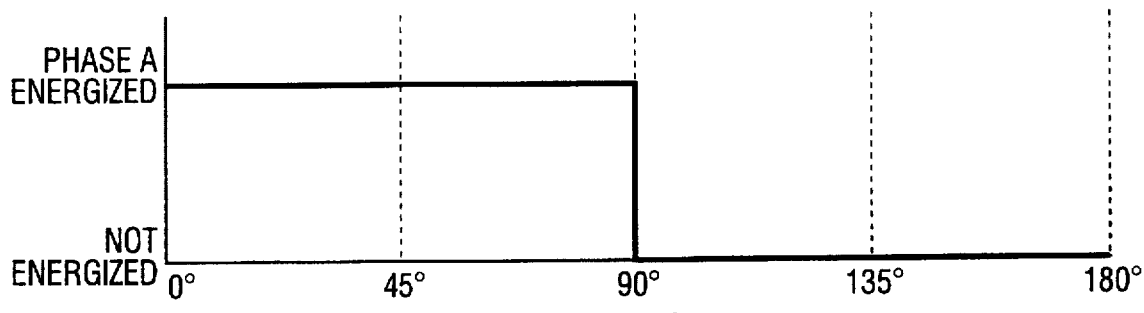
Figure 6C:
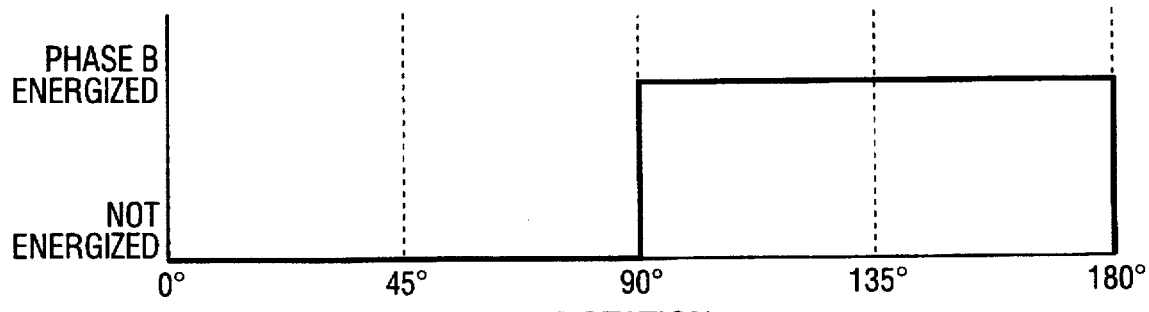

Unlike known two-phase motor systems, such as the one illustrated in FIG. 5, the two-phase motor system of the present invention uses an RPT with two sensing devices 75 and 76 which are influenced by the same vane 74. In the present invention, each of the two sensing devices is associated with a different winding phase and each sensing device is configured and positioned to produce a first logic level signal (e.g., a logic high) when energization of its associated phase winding will result in positive torque, and a second logic level signal (e.g., a logic low) at all other times.

The outputs of the two sensing devices are coupled to an electronic controller 77. The electronic controller is also coupled to switching devices (not shown in FIG. 7) that are coupled between the phase windings of the motor and a source of substantially constant DC voltage.

Figure 8:
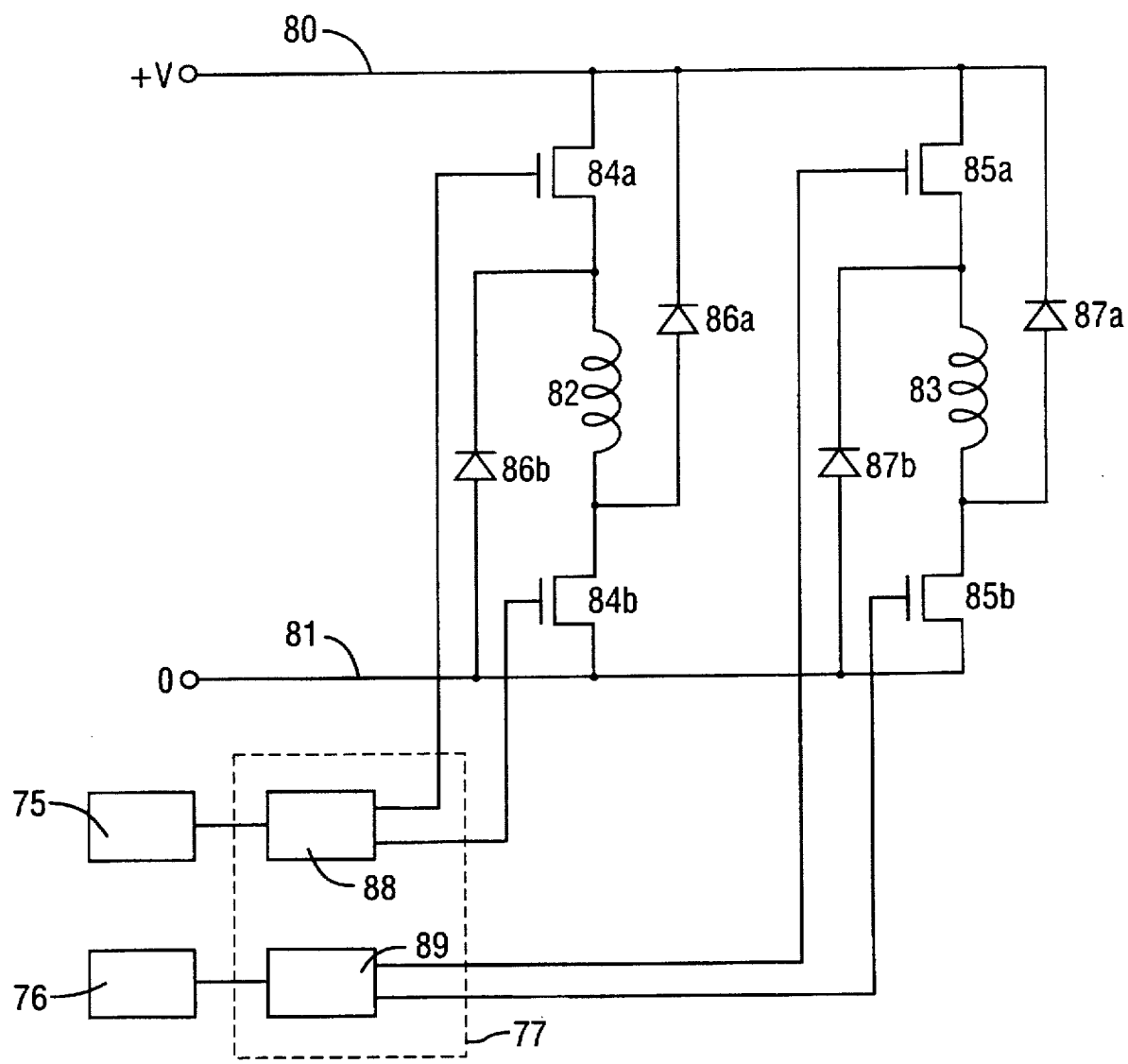
FIG. 8 schematically illustrates a controller that may be used in the present invention.

FIG. 8 schematically illustrates a simplified diagram of a controller 77 that may be used in the present invention. As illustrated in FIG. 8, a source of substantially constant DC voltage +V is provided across DC bus lines 80 and 81. Coupled across the DC bus lines 80 and 81 are the phase windings of the motor 70 schematically represented as inductances 82 (representing Phase A) and 83 (representing Phase B). Switching devices 84a and 85a couple the phase windings to the positive line and switching devices 84b and 85b couple the phase windings to the negative or ground line 81 of the DC bus. The switching devices may be relays, power transistors, power MOSFETs, IGBTs, MOS controlled thyristors (MCTs), or the like. Return diodes 86a and 87a are coupled to the phase winding and the positive line 80 of the DC bus to provide a current path when the switching devices 84 and/or 85 are turned off and there is current still in the associated phase winding. Similarly, diodes 86b and 87b connect the phase winding to the lower DC bus line.

As illustrated in FIG. 8, the electronic controller 77 receives the output signals from the sensing devices 75 and 76 and generates switching signals to control the switching devices. In the simplified schematic of FIG. 8, the electronic controller simply comprises amplifiers 88 and 89 that respectively receive and amplify the output signals from sensing devices 75 and 76 to provide switching signals for the switching devices. Embodiments are envisioned where amplifiers 88 and 89 are eliminated and the outputs from the sensing devices 75 and 76 are used directly to control switching devices. In the exemplary schematic of FIG. 8, the switching devices are such that a logic high output from the sensing devices will produce a switching signal that turns on the appropriate switching devices and energizes the phase winding associated with these devices. For example, if the output of the sensing device 75 is a logic high, controller 77 will produce a signal that turns on the switching devices 84a and 85a, thus providing an electrical path between the positive bus line 80 and the ground bus line 81 through the phase winding 82. When the switching devices 84a and 85a are turned on, current will build up and begin to flow through the phase winding 82 until the switching device 84a and 84b are turned off, at which time the current in phase winding 82 will decay through the path provided by the diodes 86a and 86b.

As those skilled in the art will recognize, the simplified controller 77 illustrated in FIG. 8 is but one example of a controller that can be used in accordance with the present invention. The present invention is applicable to a large number of controllers and is not intended to be limited to the exemplary controller of FIG. 8. For example, a more complicated controller could be used that controlled the current in the phase windings by chopping the voltage applied to the windings through controlled switching of the switching devices.

As discussed above, the present invention concerns the control of a two-phase switched reluctance motor such that the starting torque is increased and the torque ripple decreased. The way that these advantages are obtained in the present invention is explained generally by reference to FIGS. 9A and 9B.

Figure 9A:
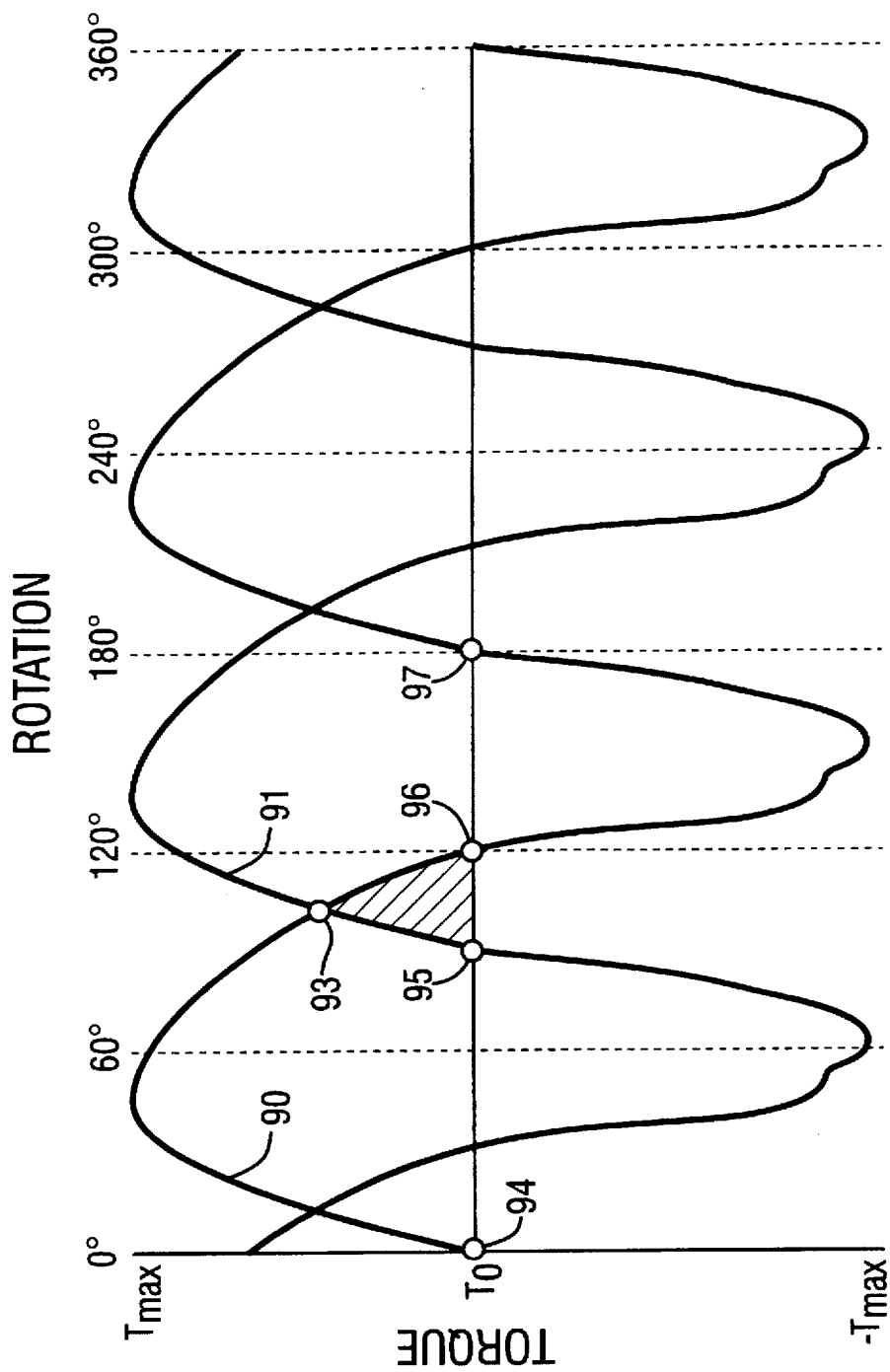
FIG. 9A generally illustrates the torque profile of a two-phase switched reluctance motor that may be used in the present invention.

FIG. 9A illustrates in solid lines the torque profile for the two-phase motor of FIG. 7 over 360 degrees of rotor rotation. Some of the details have been exaggerated to aid explanation. The line marked 90 represents the torque profile that will result if constant current is applied to the windings of phase A and the line marked 91 illustrates the same information for Phase B. As illustrated, there is a point 93 where the positive torque produced by energization of either Phase A or Phase B alone is relatively low. The inventor of the present invention has recognized that by energizing the windings in accordance with the present invention it is possible to greatly increase the starting torque of a two-phase motor if it should stop at a position corresponding to position 93 and to decrease the torque ripple. In particular, if the windings are energized independently of one another it is possible to effectively double the minimum torque and minimize the torque ripple. For example if each phase winding is energized near the time it starts to produce positive torque and de-energized near the time it begins to produce negative torque, there will be rotor positions for which both phase windings are energized. During these intervals, the torque produced by the two windings will be additive, resulting in increased torque production of the motor.

Figure 9B:
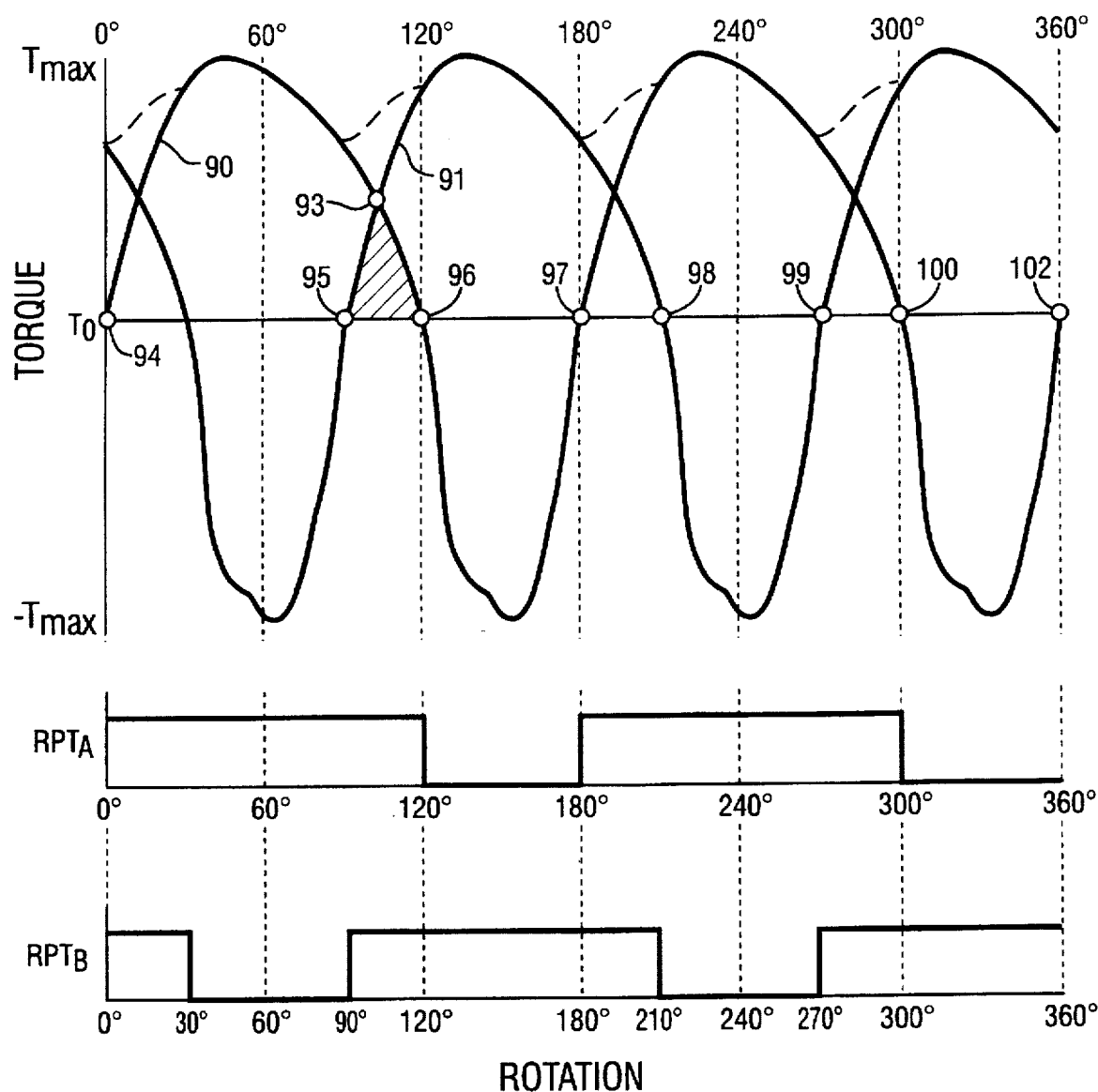
FIG. 9B generally illustrates the available torque and switching signals for a switched reluctance motor system constructed in accordance with the present invention.

FIG. 9B illustrates in a dashed line the torque profile that will result if the phase winding for Phase A is energized at point 94 (near the point where Phase A begins to produce positive torque) and de-energized at point 96 (near the point where Phase A begins to produce negative torque) and the phase winding for Phase B is energized at corresponding point 95 and de-energized at point 98. As the dashed line indicates, during the interval when both phases are energized, the torque is additive and the produced torque will increase significantly, resulting in a much higher starting torque at point 93 and a much smaller torque ripple. It should be noted that the specific energization and de-energization positions illustrated in FIG. 9B are not critical to the present invention. As long as there are time intervals during which both phase windings are energized and produce positive torque, it is possible to increase the starting torque of the motor and reduce torque ripple.

In order to implement the switching arrangement of the present invention, a specially configured and positioned RPT with two sensing devices may be used to control the energization of the phase windings. Two sensing devices are necessary because a single sensing device is used to control independently the energization of each phase winding. A specially configured RPT is necessary because the time duration of the logic high signal from each sensing device is required to be different from the time duration of its logic low signal. This is unlike known RPTs for two-phase motors. In the present invention, the specially configured RPT is used because, with stepped-gap motors, the ratio of duration of the positive torque region of the motor's torque curve to the negative torque region is greater than one. In the present invention, the RPT is configured and arranged such that one sensing device produces a first logic level signal (e.g., a logic 1) over the portion of the electrical cycle during which energization of the phase winding associated with that device will produce positive torque on the rotor and a second logic level signal (e.g., logic zero) during the portion of the electrical cycle during which energization of the phase winding associated with that device will produce negative torque on the rotor The lower portion of FIG. 9B generally illustrates the desired outputs from an RPT that may be used in the present invention, though the absolute values of the angles used are exemplary. A first digital signal $RPT_A$ represents a desired output for the sensing device associated with phase winding A. As illustrated in FIG. 9B, the output of this sensing device is logic high over the portion of the rotor's rotation cycle during which positive torque is produced by the rotor when Phase A is energized and logic low at all other times. Similarly, the output of $RPT_B$ is logic high when the torque produced by energizing Phase B is positive and logic low at all other times. Notably, between points 95 and 96 (the point corresponding to the energization of phase winding B and the de-energization of phase winding A) the output of both sensing devices is high, since energization of each phase will produce positive torque. In a like manner both windings will be energized between the points 97 and 98, 99 and 100, 101 and 102 and 94.

As discussed above, in the present invention the outputs of the RPT sensing devices are applied to an electronic controller 77 which uses the RPT outputs as switching signals to apply electric current to the appropriate windings. In the above example, the electronic controller 77 should apply electric current to the winding Phase A whenever the output of $RPT_A$ is high and apply electric current to winding B whenever the output of $RPT_B$ is high. The construction of electronic controllers that apply current to phase windings in a reluctance motor in response to RPT signals is known in the art and is not discussed in detail because the particular construction of the electronic controller is not essential to the present invention as long as current is applied according to the RPT signals as described above.

As FIG. 9B illustrates, the ratio of the portion of the rotor's rotation cycle during which the output of a given RPT is logic high to the ratio over the portion of the rotor's rotation cycle during which it is low is not unity as is typical with known RPTs. Accordingly, specially configured RPTs must be used.

Figure 10:
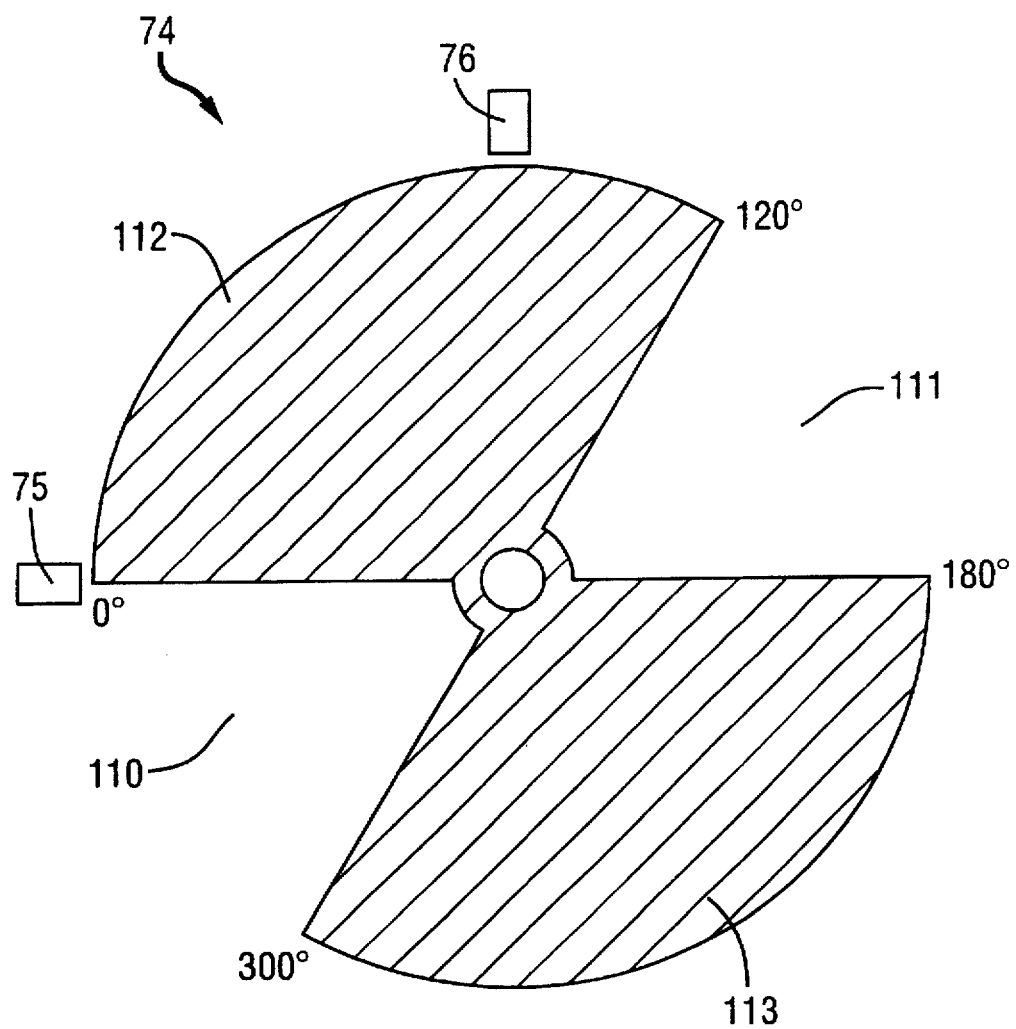
FIG. 10 illustrates in greater detail the construction and positioning of the RPT of the present invention.

FIG. 10 illustrates in greater detail one example of the RPT configuration of the present invention which is generally illustrated in FIG. 7. FIG. 10 generally illustrates the shape of vane 74 and the positioning of sensing devices 75 and 76.

In the embodiment of FIG. 10, the sensing devices 75 and 76 are of the type that include a light source and a light detector. Accordingly, the vane 74 illustrated in FIG. 10 comprises light transmissive portions 110 and 111 (the "space" portions of the vane) and light inhibiting portions 112 and 113 (the "mark" portions of the vane). Unlike the vanes used with known two-phase switched reluctance motors, the vane 74 constructed in accordance with the present invention has mark and space regions that are unequal.

The operation of RPTs using switching vanes and light detectors is well understood. Generally, a light beam is provided which passes from a light source to a detector. When the light beam is incident upon the detector, the detector produces a digital signal at a first logic level (e.g., a logic "0"). When the light beam is interrupted, for example by the passing of a vane between the beam source and the detector, the beam is not incident on the detector and the detector produces a digital output at a second logic level (e.g., a logic "1"). In the present example, the time interval when the detector produces a logic "1" signal is referred to as the "mark" period and the time interval over which the detector produced a logic "0" signal is referred to as the "space" period. The present invention is not directed to the use of switching vanes per se, but, may include the unique mark/space relationship proposed by the present inventor.

Referring back to FIG. 10, it may be noted that the angular extent (expanse) of the mark portions 112, 113 of the vane 74 vary significantly from the angular extent (expanse) of the space portions 110, 111 of the vane. In this embodiment of the present invention, the vane 74 should be constructed such that the mark portions of the vane correspond directly to the positive torque regions of the torque profile. For example, referring to FIG. 9B it may be noted that the positive torque region for Phase A extends over the region defined by the rotor's rotation from the 0 degree position to the 120 degree position and over the region defined by the rotor's rotation from the 180 degree position to the 300 degree position. Accordingly, the vane 74 has a first mark region 112 with an angular expanse from a 0 degree position to a 120 degree position and a second mark region 113 with an angular expanse from the 180 degree position to the 300 degree position.

The construction of rotor vane 74 in FIG. 10 is exemplary only. As those skilled in the art will recognize, the present invention is applicable to other two-phase motors having different torque profiles with different regions of positive torque and to two-phase motors with different numbers of poles. In general, however, the mark regions of the vane should correspond to the positive torque regions of a given phase of the motor. In practice, the positive torque producing region for a given motor can be calculated experimentally or, preferably, determined empirically by examination of the motor. Each phase winding can be energized and the rotor can be rotated from the position corresponding to 0 mechanical degrees to 360 mechanical degrees while the resulting torque is measured through the use of known torque-measuring techniques.

As the above indicates, once the positive torque producing regions of the phase windings are known, the construction of the appropriate vane is fairly straight forward. The positive torque producing region for a given phase is determined and the mark regions of the rotor are then sized to correspond to the positive torque regions. After the mark and space regions of the vane have been determined, the RPT vane may be constructed using known cutting and manufacturing techniques.

As those skilled in the art will recognize and as generally discussed above, to generate the appropriate RPT signals, it is sometimes necessary to slightly increase the desired mark region to compensate for the fact that the light beam that is interrupted by the vane has a finite width. To the extent that beam width compensation is required, it should be added on to the vane after the mark/space regions have been determined in accordance with the present invention. When such modifications are made, the angular span of the mark region of the vane will generally, but not exactly, correspond to the positive torque producing region of the phase windings. A similar modification may be required for other types of sensing devices. In all cases, however, the aim is to produce RPT signals whose mark/space ratios correspond to and are proportional to the ratios of angular periods of positive and negative torque.

The positioning of the two sensing devices 75 and 76 in the present invention takes advantage of the fact that the placement of the rotor poles about the rotor is symmetric and that each rotor pole is offset from the next adjacent rotor pole by 180 mechanical degrees. When a rotor having two symmetric rotor poles is used, the two sensing devices 75 and 76 should be positioned such that the angle formed by the two sensing devices 75 and 76 spans 90 mechanical degrees. This is illustrated in FIG. 10 where the angle spanned by sensing devices 75 and 76 is 90 mechanical degrees.

Figure 11A:
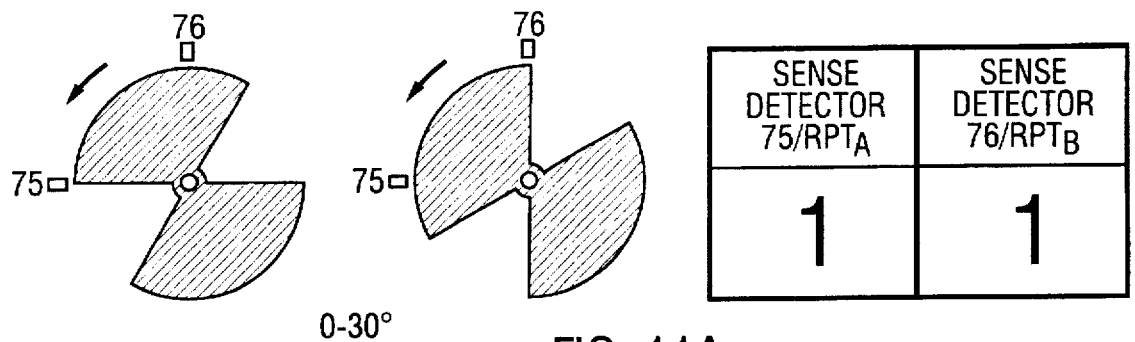
FIGS. 11A–11D generally illustrate the generation of switching signals in response to the rotor's angular position in accordance with the present invention.
Figure 11B:
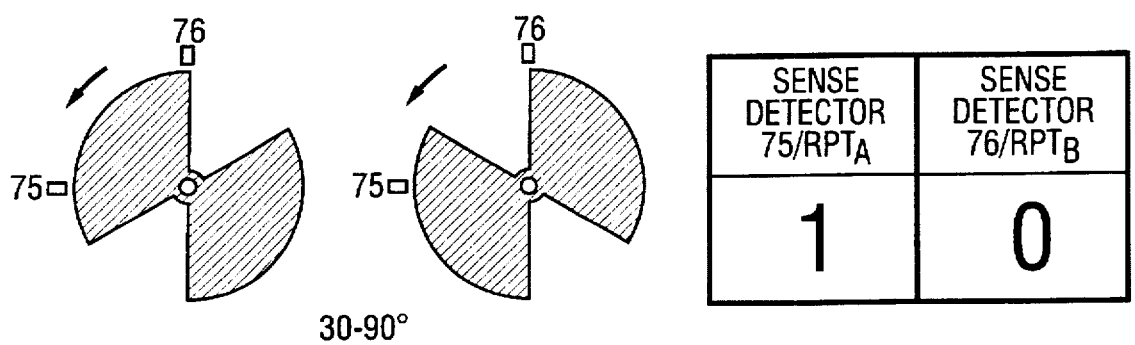

When the RPT vane is properly constructed and the sensing devices properly positioned in accordance with the present invention, the appropriate switching signals will be generated. This is illustrated in FIGS. 11A–11D. As FIG. 11A indicates, during the interval over which the rotor rotates from angular position represented by 0 degrees to the angular position represented by 30 degrees, the output of sense detector 75, and $RPT_A$, and the output of sense detector 76 and $RPT_B$, are both logic "1", resulting in the energization of phase windings A and B. As the rotor continues to rotate from 30 degrees to 90 degrees the mark region of the vane will continue to block light from sense detector 75, resulting in a logic "1" $RPT_A$ signal over this interval, and continued energization of phase winding A. Over this same period there is nothing to block the light to sense detector 76 and the output $RPT_B$ signal is a logic "0". This is illustrated in FIG. 11B.

Figure 11C:
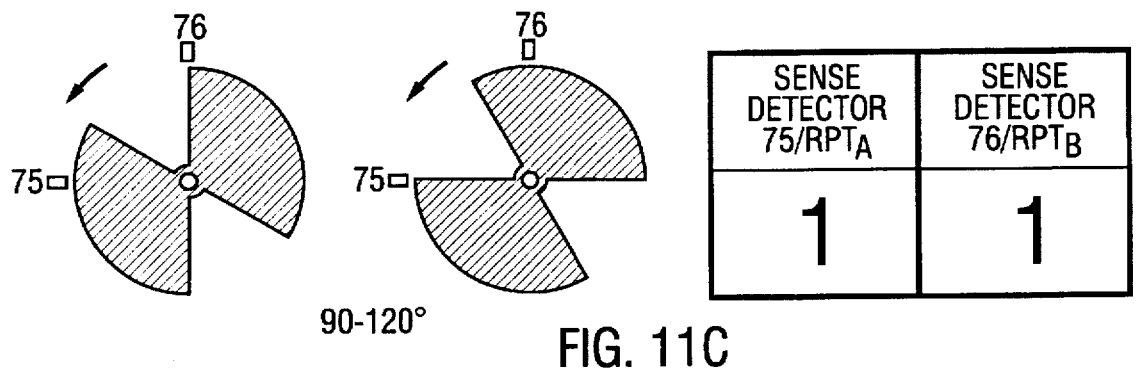
Figure 11D:
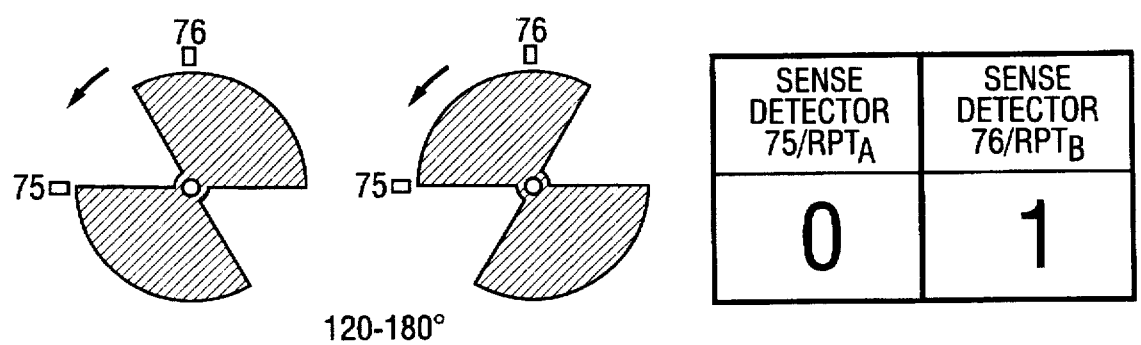

FIG. 11C illustrates the rotor's rotation from 90 degrees through 120 degrees. During this period of rotation, the outputs of both RPT sensors are high and both phase windings are energized. FIG. 11D illustrates the outputs for the rotor's rotation from 120 degrees to 180 degrees. During this interval, the output of $RPT_A$ is a logic "0" and the output of $RPT_B$ is a logic "1". Because the rotor is symmetrical, the RPT outputs for the region defined by 180 degrees to 360 degrees is a duplicate of the region defined by 0 degrees to 180 degrees. As explained above, the outputs of the RPT are applied to the electronic controller to control the switching of the phase windings.

The invention utilizes the overlapping angular region in which torque in the desired direction is available from both phases of a two-phase reluctance machine. To achieve this in at least a portion of the region in which torque is available both phases are energized simultaneously. While it is described above in relation to the full region in which torque is available from both phases, the skilled person will appreciate that a proportion of the region may be used for simultaneous energization instead.

The invention is also applicable to reluctance generators in which the applied input torque is translated into an output voltage. By simultaneous switching of the windings, according to the invention a smoother output voltage can be produced.

The skilled person will also be aware that reluctance machines can be arranged with the rotor embracing an inner stator. The invention is equally applicable to this construction as well. Similarly, the invention can be used in relation to linear reluctance motors in which the moving member travels across a sequentially energized stator track. The moving member in a linear reluctance motor is still, often referred to as the rotor. The term "rotor" is intended to embrace such moving members in linear reluctance motors.

While the invention has been described in connection with the illustrative embodiments discussed above, those skilled in the art will recognized that many variations may be made without departing from the present invention. For example, the discussed examples utilized an RPT making use of a light sensor and a vane including light transmissive and light blocking regions. As those skilled in the art will be aware, light reflecting and non-light reflecting regions could be used and other types of RPTs, including RPTs using Hall-effect devices and RPTs where the mark and space regions are reversed could be used without departing from the scope of the present invention. Moreover, the specific mark and space regions in the above example were provided for illustrative purposes only. It will be understood that different mark space regions can be used without departing from the present invention.

The above description of several embodiments is made by way of example and not for purposes of limitation. In particular, the invention is applicable to switched reluctance machines having numbers of stator and rotor poles different from those illustrated above. The present invention is intended to be limited only by the scope of the following claims.

What is claimed is:

1. A method of operating a two-phase switched reluctance motor to produce torque in a desired direction, the motor including a rotor, a first phase winding and a second phase winding, the method comprising the acts of:

over a first range of rotor positions, energizing the first phase winding individually to produce torque in a desired direction;

over a second range of rotor positions, energizing the second phase winding individually to produce torque in the desired direction; and over a third range of rotor positions, energizing both phase windings simultaneously such that both of the phase windings will produce torque in the desired direction to produce increased and smoother torque;

wherein the first, second, and third ranges of rotor positions are selected such that, for each phase winding and for each rotation of the rotor, the range of rotor positions in which each phase winding is energized is greater than the range of rotor positions in which each phase winding is not energized.

2. The method of claim 1 wherein the act of energizing the first phase winding individually further comprises
energizing the first phase winding individually at all rotor positions where energization of the first phase winding will produce torque in the desired direction and energization of the second phase winding would not produce torque in the desired direction, the act of energizing the second phase winding individually further comprises
energizing the second phase winding individually at all rotor positions where energization of the second phase winding will produce torque on the rotor in the desired direction but energization of the first phase winding would not produce torque in the desired direction, and the act of energizing both phase windings simultaneously further comprises
energizing both phase windings simultaneously at all rotor positions where both phases will produce torque in the desired direction.

3. A control system for controlling a two-phase switched reluctance motor to produce torque in a desired direction, the motor including a rotor, a first phase winding and a second phase winding, the control system comprising:

a first rotor position transducer sensing device that produces a signal of a first level whenever energization of the first phase winding will produce torque in the desired direction;

a second rotor position transducer sensing device that produces a signal of the first level whenever energization of the second phase winding will produce torque in the desired direction;

a first switching device electrically coupled to the first rotor position transducer sensing device for energizing the first phase winding whenever the signal produced by the first rotor position transducer sensing device is of the first level; and a second switching device electrically coupled to the second rotor position transducer sensing device for energizing the second phase winding whenever the signal produced by the second rotor position transducer sensing device is of the first level.

4. The control system of claim 3 wherein the first and second switching devices are power MOSFETs.

5. The control system of claim 3 further comprising a first amplifier whose input is electrically coupled to the output of the first rotor position transducer sensing device and whose output is electrically coupled to the first switching device.

6. The control system of claim 3 wherein the signals produced by the first and second rotor position transducer switching devices are logic signals and wherein the first level is the logic high level.

7. The control system of claim 3 wherein a shaft is coupled to the rotor and a vane is coupled to the shaft, the vane including mark and space regions, wherein each mark and space region covers an angular expanse, wherein the first and second rotor position transducer sensing devices sense the mark and space regions of the vane.

8. The control system of claim 7 wherein the vane includes two mark regions and two space regions.

9. The control system of claim 8 wherein the angular expanse of the two mark regions is equal, wherein the angular expanse of the two space regions is equal and wherein the angular expanse of the mark regions is different from the angular expanse of the space regions.

10. The control system of claim 7 wherein the sensing devices include a light source and a detector and wherein the mark regions of the vane comprise light inhibiting material and wherein the space regions of the vane are light transmissive.

11. The control system of claim 7 wherein the sensing devices comprise Hall-effect devices.

12. The control system of claim 11 wherein the mark regions of the vane comprise ferromagnetic material.

13. The control system of claim 7 wherein the angular expanses covered by the mark regions of the vane correspond to the positive torque regions of the first phase winding.

14. A switched reluctance motor system for increasing and smoothing the torque output of a switched reluctance motor, the system comprising:

a two-phase switched reluctance motor including a stator, a first phase winding, a second phase winding and a rotor;

a first rotor position transducer sensing device for producing signals that control the energization of the first phase winding;

a second rotor position transducer sensing device for producing signals that control the energization of the second phase winding; and a control circuit that controls energization of the first and second phase windings based upon the signals produced by the first and second rotor position transducer sensing devices.

15. The switched reluctance motor system of claim 14 wherein the rotor is a stepped air-gap rotor.

16. The switched reluctance motor system of claim 14 wherein the first rotor position transducer sensing device produces a signal of a first level whenever energization of the first phase winding will produce torque on the rotor in a desired direction.

17. The switched reluctance motor system of claim 16 wherein the second rotor position transducer sensing device produces a signal of the first level whenever energization of the second phase winding will produce torque on the rotor in the desired direction.

18. The control system of claim 17 wherein a shaft is coupled to the rotor and a vane is coupled to the shaft, the vane including mark and space regions, wherein each mark and space region covers an angular expanse, wherein the first and second rotor position transducer sensing devices sense the mark and space regions of the vane.

19. The control system of claim 18 wherein each complete rotation of the rotor results in angular periods of positive and negative torque and wherein the ratio of the mark regions of the vane to the space regions of the vane is proportional to the ratio of the angular periods of positive torque to the angular periods of negative torque.

20. A system for controlling the energization of a two-phase switched reluctance motor, the motor including a rotor, a shaft coupled to the rotor, a first phase winding and a second phase winding, and wherein the rotor and the phase windings are arranged to produce torque in a desired direction, the system comprising:

a first sensing device for producing signals to control the energization of the first phase winding;

a second sensing device for producing signals to control the energization of the second phase winding;

a vane coupled to the shaft, the vane including mark regions and space regions, the mark and space regions influencing the first and second sensing devices; and a control circuit that controls energization of the first and second phase windings based upon the signals produced by the first and second sensing devices.

21. The rotor position transducer assembly of claim 20 wherein the mark and space regions each cover an angular expanse, and wherein the vane includes mark regions and space regions of equal number, the number equal to the number of poles on the rotor.

22. The rotor position transducer assembly of claim 21 wherein the angular expanse of the mark regions is equal, wherein the angular expanse of the space regions is equal, and wherein the angular expanse of the mark regions is different from the angular expanse of the space regions.

23. The rotor position transducer assembly of claim 21 where the number is two.

24. The control system of claim 21 wherein each complete rotation of the rotor results in angular periods of positive and negative torque and wherein the ratio of the mark region of the vane to the space regions of the vane is proportional to the ratio of the angular period of positive torque to the angular periods of negative torque.

25. A method of operating a two-phase switched reluctance motor to produce a motive force in a desired direction, the motor including a rotor, a first phase winding and a second phase winding, the method comprising the acts of energizing each phase winding individually; and energizing both phase windings simultaneously in between energizing the phase windings individually to produce increased and smoother torque;

such that for each rotation of the rotor, each phase winding is energized over a greater angular interval of rotor rotation than the phase winding is not energized.

26. A control system for controlling a two-phase switched reluctance motor to produce a motive force in a desired direction, the motor including a rotor, first and second phase windings which are energizable to cause movement of the rotor, the control system comprising:

a first rotor position transducer sensor that produces an output indicative of a first period in which energization of the first phase winding will produce the motive force in the desired direction;

a second rotor position transducer sensor that produces an output indicative of a second period in which energization of the second phase winding will produce the motive force in the said desired direction;

a first switching device operably coupled with the first rotor position transducer sensor for energizing the first phase winding when the output is produced by the first rotor position transducer sensor; and a second switching device operably coupled with the second rotor position transducer sensor for energizing the second phase winding when the output is produced by the second rotor position transducer sensor.

27. A control system as claimed in claim 26 in which each of the first and second rotor position transducing sensors is arranged to produce a respective output whenever energization of the corresponding phase winding will produce the motive force.

28. A rotor position transducer for a two-phase switched reluctance machine, the machine including a rotor, a stator and first and second phase windings, the rotor position transducer comprising:

a first sensing device for producing an output adapted to control the energization of the first phase winding;

a second sensing device for producing an output adapted to control the energization of the second phase winding; and a transducer member arranged to move with the rotor, the member having first and second sensing device output influencing regions and spaces between the regions.

29. A rotor position transducer for a two-phase reluctance machine comprising a rotor, a stator and a pair of phase windings which are energizable to cause movement of the rotor relative to the stator in a desired direction, a first sensor and a second sensor, the rotor comprising a rotatable member which, in use, rotates with the rotor, the member being arranged to influence the output of the first and second sensors, the output of each sensor being indicative of a period in which the rotor is in a position to develop torque from energization of a respective one of the phase windings.

30. A reluctance machine system comprising:

a two-phase reluctance motor having a rotor, a stator and a pair of phase windings which are energizable to cause movement of the rotor relative to the stator in a desired fashion;

first switch means operable to energize the first phase winding;

second switch means operable to energize the second phase winding;

a controller arranged to control actuation of the first and second switch means to energize the first and second phase windings when energization of the respective phase windings will develop torque in the desired direction such that, as the rotor rotates, for each phase winding, there are angular intervals: (i) wherein the phase winding is energized and (ii) wherein the phase winding is de-energized, and wherein the controller is arranged to control actuation of the first and second switch means such that the angular intervals of energization are greater than the angular intervals of de-energization.

31. A method of operating a two-phase switched reluctance motor having a rotor, a stator and a pair of phase windings, the method including:

energizing each phase winding for approximately all rotor positions where energization of the phase winding will produce torque in a desired direction such that, as the rotor rotates in the desired direction, there are rotor positions: (i) where only one phase winding is energized; and (ii) where the pair of phase windings are simultaneously energized when the rotor is in a position to develop torque in a desired direction from the energization of both phase windings and where, for each rotor position where the phase windings are simultaneously energized, the torque developed by the simultaneous energization of the pair of phase windings is greater than the torque that would be developed at that position by the energization of only one of the phase windings.

* * * * *